(12) United States Patent
Gallardo et al.

(10) Patent No.: US 8,141,826 B1
(45) Date of Patent: Mar. 27, 2012

(54) PIPE HOLDING BRACKET

(75) Inventors: Luis E. Gallardo, Vista, CA (US);
Timothy M. McConnell, San Diego, CA (US)

(73) Assignee: Securus, Inc., Vista, CA (US)

( * ) Notice: Subject to any disclaimer, the term of this patent is extended or adjusted under 35 U.S.C. 154(b) by 776 days.

(21) Appl. No.: 12/008,853

(22) Filed: Jan. 15, 2008

(51) Int. Cl.
*F16L 3/08* (2006.01)

(52) U.S. Cl. .......... 248/74.4; 248/62; 248/65; 248/68.1; 248/72; 248/73; 248/74.1; 24/16 R; 24/271

(58) Field of Classification Search ............ 248/62, 248/65, 68.1, 72, 73, 74.1, 74.4, 226.11, 248/228.3, 228.5, 230.5, 231.41, 231.61, 248/316.4, 316.6; 24/16 R, 271
See application file for complete search history.

(56) References Cited

U.S. PATENT DOCUMENTS

| | | | |
|---|---|---|---|
| 1,129,553 A | | 2/1915 | Cope |
| 2,354,919 A | | 8/1944 | Lockwood |
| 3,128,073 A | | 4/1964 | Berlyn |
| 3,188,030 A | | 6/1965 | Fischer |
| D212,505 S | | 10/1968 | Guerrero et al. |
| 3,606,217 A | * | 9/1971 | Leiferman ............ 4/695 |
| 3,718,307 A | * | 2/1973 | Albanese ............ 248/57 |
| 3,944,175 A | * | 3/1976 | Kearney ............ 248/59 |
| 4,037,810 A | | 7/1977 | Pate |
| 4,051,035 A | | 9/1977 | Boschen et al. |
| D269,155 S | | 5/1983 | Rose |
| 4,395,009 A | * | 7/1983 | Bormke ............ 248/68.1 |
| 4,555,589 A | | 11/1985 | Osada |
| 4,562,982 A | | 1/1986 | McSherry et al. |
| 4,655,023 A | | 4/1987 | Yung |
| 4,679,754 A | | 7/1987 | Richards |
| 4,763,867 A | | 8/1988 | Hungerford, Jr. |
| 4,766,651 A | | 8/1988 | Kobayashi |
| D299,213 S | | 1/1989 | Puntillo |
| 4,899,963 A | | 2/1990 | Murphy |

(Continued)

FOREIGN PATENT DOCUMENTS

JP         02292591 A    *  12/1990

OTHER PUBLICATIONS

U.S. Appl. No. 11/287,004, filed Nov. 22, 2005, Brown.

*Primary Examiner* — Terrell McKinnon
*Assistant Examiner* — Michael McDuffie
(74) *Attorney, Agent, or Firm* — Stetina Brunda Garred & Brucker; Lowell Anderson

(57) ABSTRACT

A mounting bracket is provided for mounting pipes between studs of a building. An elongated support member has two elongated sides generally perpendicular to each other and has opposing ends adapted to fasten the support member to studs of a building. A locking bracket encircles the support bracket. The locking bracket has four segments comprising a first base segment, a second flange segment, a third intermediate segment and a fourth distal segment. A flexible hinge line is formed at least between the flange and intermediate segment. The base segment and flange either abutting or are close to adjacent sides of the elongated support member during use with the intermediate segment spanning the distal edges of the sides of the support member. The fourth distal segment overlaps and nests with the first base segment to restrain motion in the plane of the base segment. A latch mechanism restrains the projection from disengaging. The projection is preferably forced against the support member by the latch mechanism.

24 Claims, 9 Drawing Sheets

U.S. PATENT DOCUMENTS

| | | |
|---|---|---|
| 4,899,964 A | 2/1990 | Sick |
| 4,905,942 A | 3/1990 | Moretti |
| 4,957,251 A | 9/1990 | Hubbard |
| 4,993,669 A | 2/1991 | Dyer |
| 5,002,244 A | 3/1991 | Holbury et al. |
| 5,044,583 A * | 9/1991 | Daigle et al. ............ 248/62 |
| 5,110,074 A * | 5/1992 | Deguchi ............ 248/340 |
| 5,131,613 A | 7/1992 | Kamiya et al. |
| 5,149,026 A | 9/1992 | Allen |
| 5,303,887 A | 4/1994 | Hasty et al. |
| 5,367,127 A | 11/1994 | Dormon |
| D368,422 S | 4/1996 | Jensen |
| 5,547,152 A | 8/1996 | Krock |
| 5,598,995 A | 2/1997 | Meuth et al. |
| D379,584 S | 6/1997 | Lindquist |
| 5,655,738 A | 8/1997 | Ragsdale et al. |
| 5,833,179 A | 11/1998 | VandenBerg |
| 5,876,000 A * | 3/1999 | Ismert ............ 248/65 |
| D408,273 S | 4/1999 | Senninger |
| 6,126,122 A * | 10/2000 | Ismert ............ 248/74.1 |
| 6,129,317 A | 10/2000 | Rodrigues et al. |
| 6,250,847 B1 | 6/2001 | Bingham, Jr. |
| 6,402,096 B1 * | 6/2002 | Ismert et al. ............ 248/68.1 |
| 6,446,915 B1 * | 9/2002 | Ismert ............ 248/68.1 |
| 6,463,631 B2 * | 10/2002 | Noda ............ 24/16 R |
| 6,464,181 B2 * | 10/2002 | Sakakura ............ 248/68.1 |
| D490,690 S | 6/2004 | Brass et al. |
| 7,377,472 B2 * | 5/2008 | Brown et al. ............ 248/74.1 |
| 7,498,511 B1 * | 3/2009 | Brown ............ 174/40 R |
| 2005/0006535 A1 | 1/2005 | Brown |
| 2006/0131465 A1 * | 6/2006 | Lynch et al. ............ 248/68.1 |
| 2007/0138350 A1 | 6/2007 | Brown |

* cited by examiner

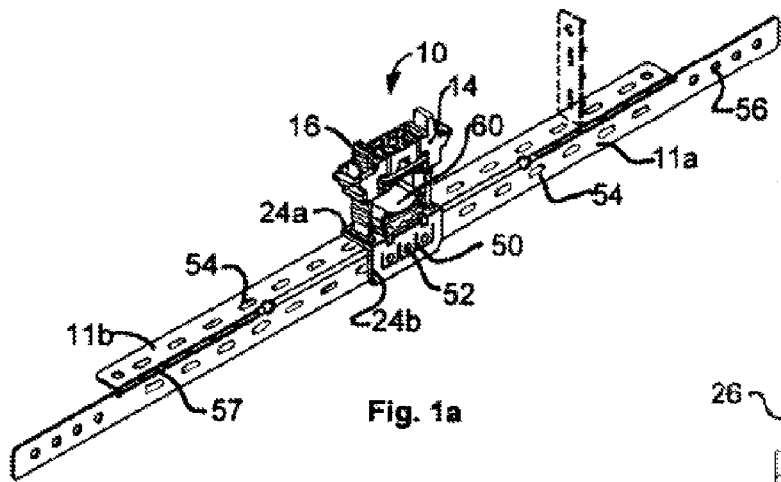
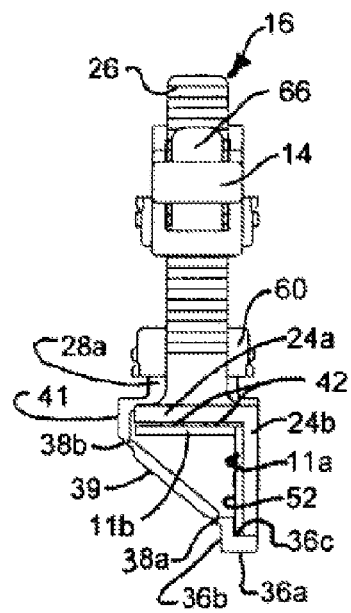
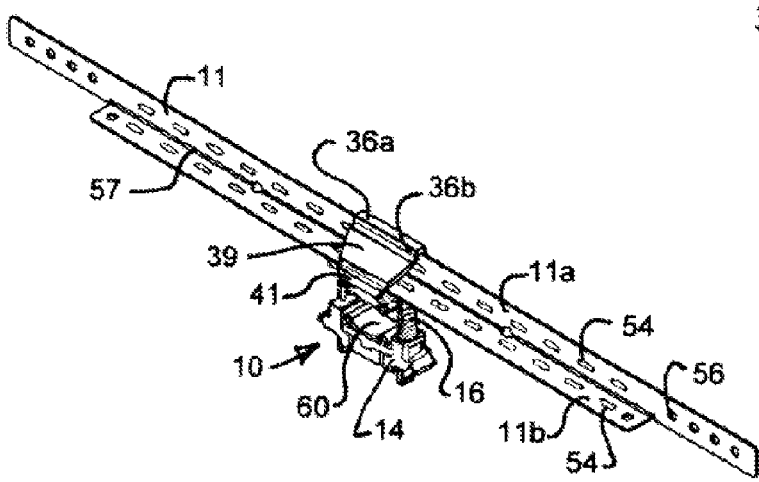
Fig. 1a
Fig. 1c
Fig. 1b

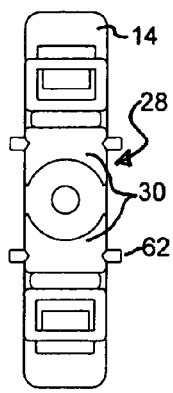
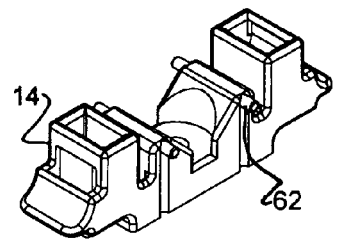
Fig. 5d    Fig. 4
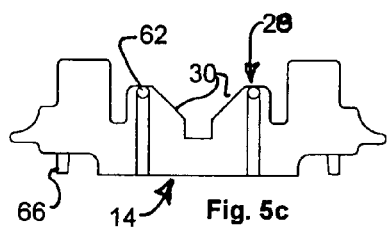
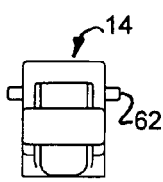
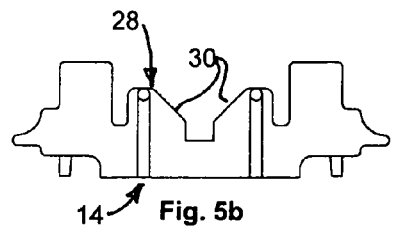
Fig. 5c    Fig. 5a    Fig. 5b
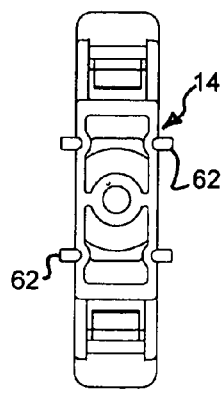
Fig. 5e

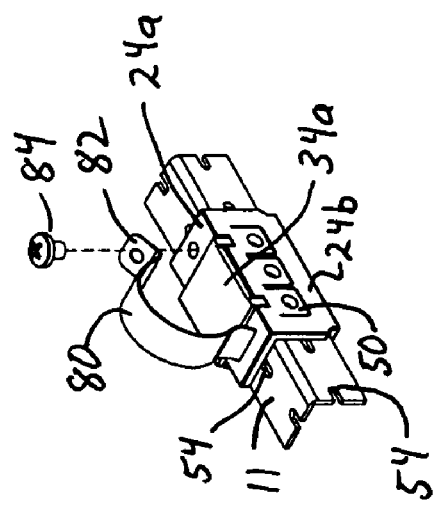
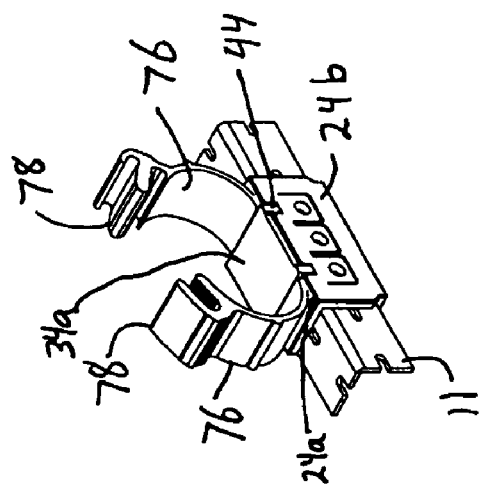
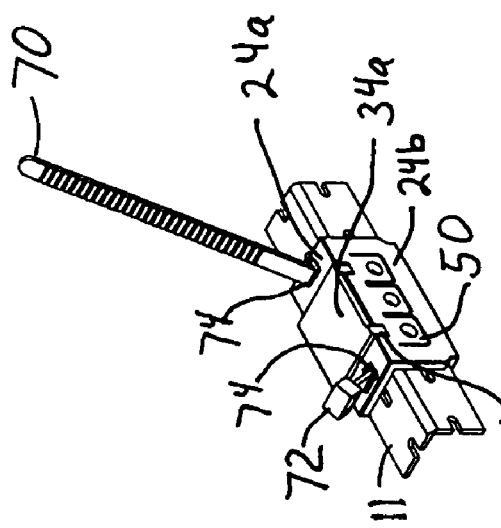

PIPE HOLDING BRACKET

BACKGROUND

Many buildings have plumbing pipes that are fastened to cross-members that are fastened between adjacent studs in the building. These cross-members are commonly formed by adjustable stub-out bars, formed by two telescoping tubes, usually rectangular in cross-section. The connection between the plumbing pipes and cross-members should be strong. Currently, installers use two hands to fasten a base to the cross-member, then position the plumbing pipe on the base and then fasten a latch member to the base to hold the pipe to the base. There is a need for an improved mounting mechanism that is faster and easier to install.

Many cross-members used to mount brackets are complex, telescoping assemblies that are expensive to produce and wasteful of materials. There is thus a need for an inexpensive cross-member using minimal materials, and a bracket for use on such cross-members.

Further, current brackets are often difficult to accurate and easily locate along a length of the cross-member. There is thus a need for an improved bracket to hold the pipe while providing an adjustable position on the bracket.

BRIEF SUMMARY

A two sided support member is provided having generally perpendicular sides forming a generally triangular cross section. Opposing ends of the support member are bent to fasten the support member to adjacent studs of a building. A bracket encircles and fastens to the support member. The bracket has four sequential segments. A first base segment is placed adjacent the top of the support member. A second flange segment aligns with the second side of the support member and is preferably formed integral with the first base segment. A third intermediate segment extends between the distal edges of the sides of the support member. The edge of the second segment preferably has a channel to receive the lower distal edge of the support member adjacent a hinge line with the third intermediate member. A fourth distal segment mates with the first base segment to partially lock the first and fourth segments. A latch mechanism prevents disengagement of the first and fourth segments. Advantageously the fourth segment has opposing sides with a mounting structure for supporting pipes or elongated members on the first side and with projections on the second side. The projections extend through openings in the first base segment to restrain movement in the plane of the base segment, and preferably abut the support member. The second flange segment preferably also has projections resiliently urged toward the support member with the flange projections sized to fit in openings in the support member to restrain movement of the bracket in the plane of the flange.

There is advantageously provided a mounting assembly for mounting devices between studs of a building. The assembly includes an elongated support member having two elongated sides generally perpendicular to each other and having opposing ends adapted to fasten the support member to studs of a building.

The assembly further includes a locking bracket having four segments comprising a first base segment, a second flange segment, a third intermediate segment and a fourth distal segment, with a flexible juncture at least between the flange and intermediate segment. The base segment and flange either abut or are placed close to adjacent sides of the elongated support member during use of the assembly. At least one of the base segment and distal segment has at least part of the device mounting mechanism thereon. The distal segment and base segment each have a portion configured to fit together in abutting relationship to restrain movement of the distal end parallel to the plane of the base segment. Thus, the bracket can encircle the support member and provide a device mounting mechanism on the bracket.

Preferably, but optionally, the base segment has at least one opening and the distal segment has a projection configured to extend through the opening in the base during use of the assembly to nest with the base and restrain movement parallel to the plane of the base. The projection preferably abuts the support member. The assembly optionally includes a latch mechanism connecting the distal segment to one of the first or second segments to hold the distal segment in position during use. Preferably, the latch member holds the projection in position abutting against the support member. The latching mechanism preferably restrains motion of the distal segment in a direction orthogonal to the base segment. The second segment is slightly larger than the adjacent side of the cross member so the projection abuts the support member while some or all of the first segment does not abut the side of the cross member aligned with that first segment.

Advantageously, there are only two sides on the elongated support member, each side having a plurality of spaced holes therein and a plurality of elongated slots at and extending along the juncture of the two sides. The device mounting mechanism preferably comprises a V-shaped structure formed on a first side of the distal segment. Further, the distal segment advantageously has opposing first and second sides with the device mounting mechanism on the first side and at least one projection extending from the second side and configured to engage at an opening in the base segment to nest with the projection. The mounting device can also include a pair of ratchet arms extending from the base segment, and a clamp having two openings each configured to receive one of the ratchet arms.

Preferably the second flange segment is rigidly joined to the base segment and extends perpendicular thereto with the second flange segment also having projections resiliently urged toward the adjacent portion of the support member. The support member preferably has openings sized to receive the projections on the second flange segment such that movement of the flange and bracket in the plane of the flange is restrained by the flange projections engaging the mating openings in the support member. Further, the second segment can have a channel adjacent the third segment where the channel is configured to receive an edge of one side of the support member and thereby restrain movement of that edge perpendicular to the first segment.

The base, first and second segments and distal segment are preferably integrally molded of an elastomeric material with a reduced thickness forming a hinge line extending between the second segments and third segments and between the third segment and the distal segment.

There is also provided a mounting bracket for mounting devices to an elongated support member extending between studs of a building on a device mounting mechanism. The elongated support member has two generally perpendicular sides to define a generally triangular cross-section. The bracket includes four sequentially joined segments including a first base segment, a second flange segment, a third intermediate segment and a fourth distal segment. A flexible juncture joins the third segment to its adjoining segments. At least one of the first base segment and fourth distal segment has at least a portion of the device mounting mechanism thereon. The fourth distal segment and first base segment each have a portion configured to nest together in abutting relationship to restrain movement of the fourth distal segment in a plane parallel to the first base segment.

In further variations, the mounting bracket includes a latch mechanism releasably fastening the fourth distal segment to the first or second segments to keep the distal segment from moving away from the first base segment during use. The fourth distal segment preferably has first and second opposing sides with the device mounting mechanism on the first side and at least one projection extending from the second side. That at least one projection is configured and located to extend through a mating opening in the first base segment a distance sufficient to abut the elongated support member during use of the bracket. The projection comprises the nesting portion that restrains movement in the plane of the base, and the bracket further includes a latch mechanism oriented to restrain movement orthogonal to the plane of the first base segment.

The device mounting mechanism can include a V-shaped structure formed on the first side of the distal segment. Further, the device mounting mechanism can include a pair of ratchet arms extending from the first base segment, and a clamp having two openings each configured to receive one of the ratchet arms.

The second flange segment preferably takes the form of a flange rigidly joined to the base segment and extending perpendicular thereto. The second segment preferably has a channel adjacent the third segment which channel is configured to receive an edge of the support member during use. The channel is sized to restrain movement of that edge perpendicular to the first base segment during use.

There is also advantageously provided a method for fastening a support bracket to a generally horizontal elongated support in a building. The support has a generally triangular cross-section formed by first and second segments which are generally perpendicular to each other and an open third side. The method includes providing a bracket having four segments comprising a first base segment, a second flange segment, a third intermediate segment and a fourth distal segment. The distal segment has opposing first and second sides with a mounting portion on the first side and a projection on the second side and an opening extending through the base. The method includes placing the first base segment and second segment of the bracket adjacent the first and second segments of the support, respectively. The method further includes rotating the second segment of the bracket until the fourth distal segment is adjacent the first base segment. The method also includes placing the projection through the opening in the first base segment until the projection abuts the support member.

Moreover, the method optionally includes latching the distal segment to the bracket. The method optionally includes restraining the projection from disengaging the opening. Finally, the method can include extending projections on the second flange segment into openings on the elongated support to restrain movement of the flange segment relative to the support in a plane parallel to the second flange segment.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1a is a top perspective view of a pipe support bracket latching around a support member;

FIG. 1b is a bottom perspective view of the pipe support bracket and support member of FIG. 1a;

FIG. 1c is an end view of the pipe support bracket and support member of FIG. 1a;

FIG. 3a is a side plan view of the pipe support bracket of FIG. 2a;

FIG. 3b is a front plan view of the pipe support bracket of FIG. 3a;

FIG. 3c is a back plan view of the pipe support bracket of FIG. 3a;

FIG. 3d is a top plan view of the pipe support bracket of FIG. 3a;

FIG. 3e is a bottom plan view of the pipe support bracket of FIG. 3a;

FIG. 4 is a top perspective view of a top clamp as used in FIG. 1a;

FIG. 5a is a side plan view of the top clamp of FIG. 4;
FIG. 5b is a front plan view of the top clamp of FIG. 4a;
FIG. 5c is a back plan view of the top clamp of FIG. 4a;
FIG. 5d is a top plan view of the top clamp of FIG. 4a;
FIG. 5e is a bottom plan view of the top clamp of FIG. 4a;

FIG. 6 is a perspective view of a cover for placement over the top clamp (and the bottom clamp) as shown in FIG. 1a;

FIG. 7b is a front plan view of the cover of FIG. 7a;
FIG. 7c is a back plan view of the cover of FIG. 7a;
FIG. 7d is a top plan view of the cover of FIG. 7a;
FIG. 7e is a bottom plan view of the cover of FIG. 7a;

FIG. 9a is a side plan view of the bracket of FIG. 8a;
FIG. 9b is a front plan view of the bracket of FIG. 9a;
FIG. 9c is a rear plan view of the bracket of FIG. 9a;
FIG. 9d is a top plan view of the bracket of FIG. 9a.

FIGS. 11a-11c show the bracket of FIG. 1 with different pipe supports on that bracket.

DETAILED DESCRIPTION

Figure 2A:
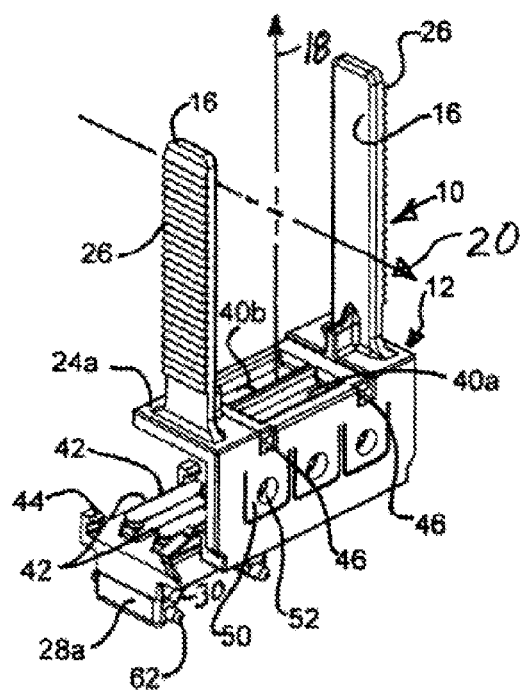
FIGS. 2a and 2b are top and bottom perspective views, respectively, of the pipe support bracket of FIG. 1a in an unlatched position with a clamp portion removed from the mechanism used to hold pipes to the bracket.

Referring to FIGS. 1-10, a bracket 10 is fastened to cross-member 11. The cross member has two sides 11a, 11b joined or formed at right angles to define a generally triangular cross-section. One or both of the sides 11a, 11b have an end so there are opposing ends that are configured to fasten to adjacent supports or studs in a building. The bracket 10 has structure that encircles and fastens to cross-member 11, and has a device mounting mechanism on the bracket. The bracket 10 has a base 12 removably connected to a removable clamping block 14 by at least one and preferably a pair of generally parallel arms 16. The clamping block 14 and arms 16 are part of the device mounting mechanism. The arms 16 extend along a separation axis 18 (FIG. 2) that is orthogonal to a longitudinal axis 20 of a pipe, cable, wire or other elongated member 22 (FIG. 10d) to be held in the bracket 10 between the base 12 and clamping block 14. The longitudinal axis 20 may curve with the pipe or cable, but the orthogonal axis 18 is advantageously straight. For ease of illustration, the elongated member 22 will be described relative to a pipe.

The base 12 can take diverse forms. Advantageously the base 12 comprises four segments joined sequentially, with the first segment comprising a generally flat base plate 24a from which the arms 16 extend. The arms 16 preferably have ratchet teeth 26 on them. The teeth 26 are shown as extending outward from the arms 16. But the teeth could take the form of recesses in the arms, with the edges of the recesses forming the engaging surfaces comparable to teeth 26. As used herein, the reference to teeth 26 will refer to the engageable surfaces of the teeth whether those engageable surfaces extend outward from the arms 16 or are formed by recesses extending into the arms. The teeth 26 could be placed on the inside of the arms 16, the side facing the axis 18 and pipe 22. As used herein, the inner or inward direction refers to a relative orientation or direction toward axis 18. The outer or outward direction refers to a relative orientation or direction away from axis 18.

Figure 9D:
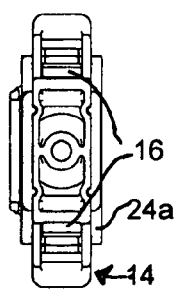
Figure 9C:
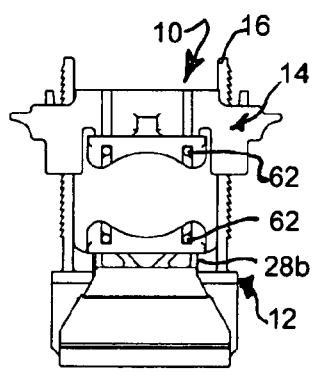
Figure 9A:
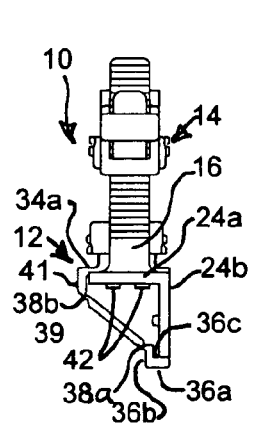
Figure 9B:
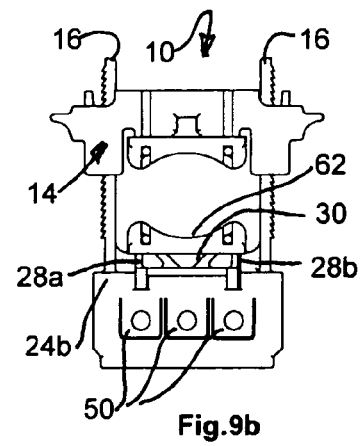
Figure 9E:
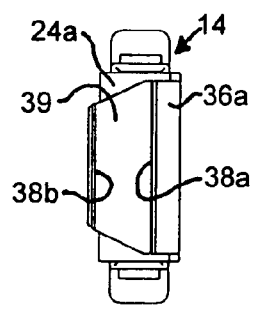
FIG. 9e is a bottom plan view of the bracket of FIG. 9e.

Located between the arms 16 during use is part of the device mounting mechanism for holding the elongated member 21. The device mounting mechanism advantageously, but optionally, includes two inclined base supports 28a, 28b in addition to the arms 16 and clamp block 14. Each support 28a, 28b extends away from the base plate 24a toward the clamping block 14 during use as seen in FIGS. 9a & 9c. Each support 28a, 28b can take various forms, including configurations conforming to the exterior shape of the member 22 at the location where the bracket 10 engages the elongated member. Preferably, the support 28 comprises a support for the elongated member 22. The support 28 preferably includes an inclined surface 30 that angles toward the base plate 24a. The inclined surface 30 (FIG. 3) is preferably straight, but could be contoured to conform more closely to the mating surface of pipe 22 or other elongated member or other diversely shaped item. The inclined surfaces 30 advantageously join adjacent base plate 24a during use so that the supports 28a, 28b form a generally V shaped support centered relative to axes 18 and 20. Alternatively, the inclined surfaces 30 could join base plate 24a with a slight gap or space between the between the supports 28, as described later regarding removable clamp block 14.

Advantageously, but optionally, the supports 28a, 28b each form a single surface facing the pipe 22 during use, but the supports 28a, 28b could be formed by parallel, spaced apart plates that extend from base plate 24a toward the pipe 22 and having distal edges shaped to receive the pipe. The supports 28, with or without the inclined surfaces 30, and including the various forms the supports 28 can take, advantageously provide a first support means for holding the elongate member 22 during use of the clamp assembly.

Figure 2B:
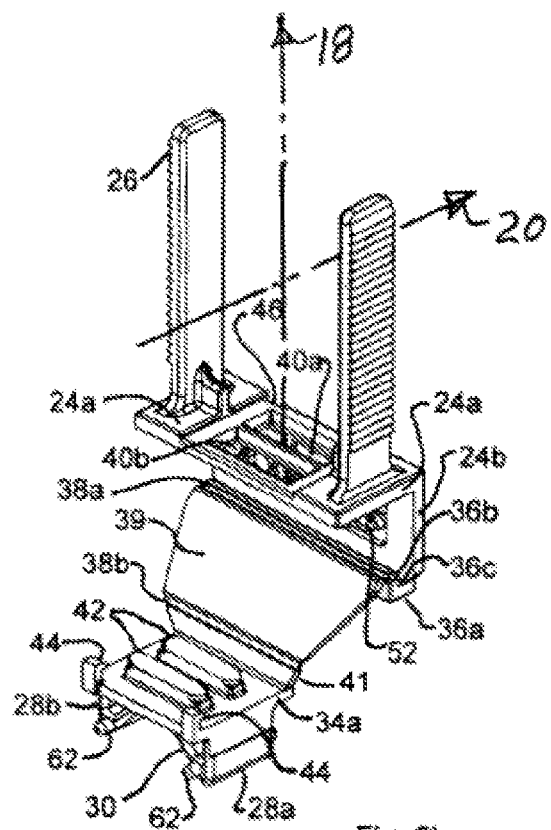
Figure 8A:
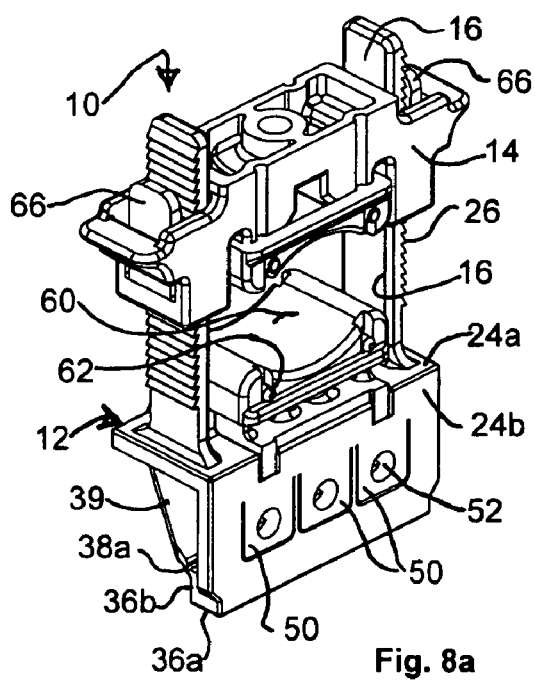
FIGS. 8a and 8b are front and back perspective views, respectively, of the bracket of FIG. 2a in a closed configuration and with a pipe clamp on the bracket.
Figure 8B:
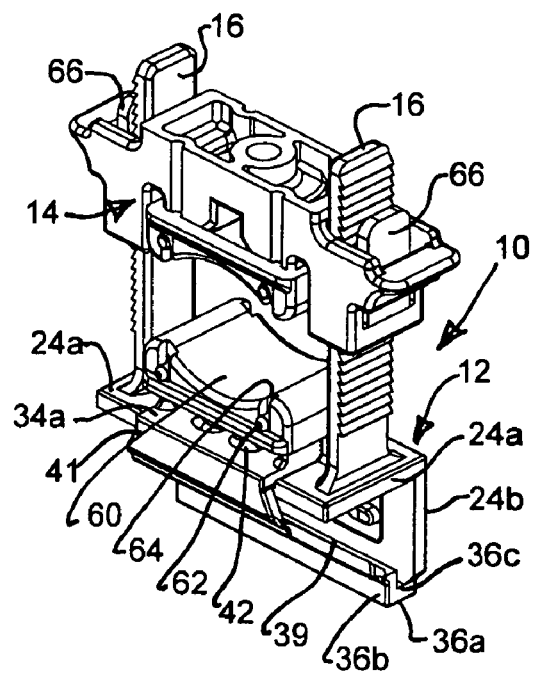

As seen in FIGS. 2, 8 and 9, the base plate 12 is formed of two joined parts, one of which is the first segment, plate 24a and which is advantageously generally flat and has a lower, flat surface facing toward the cross-member support 11 to which the base 12 is mounted during use. The cross-member 11 has two sides 11a, 11b joined at right angles with the side 11a being generally vertical and side 11b being generally horizontal in the illustrations. The ends of side 11a are configured to be screwed or nailed to the building supports. The ends of side 11b could stop before the supports or are bent to extend vertically along the building studs or supports. The base plate 24a is generally parallel to the adjacent side 11b of the cross member 11, but preferably some or all of the base plate 24a (the first segment) does not abut the side 11b of the cross member 11 aligned with that first segment 24a. The base plate 24a is preferably very close to the top side 11b during use.

The second segment is flange 24b which together with the base plate 24a forms the base 12. The flange 24b depends downward from the base plate 24a adjacent the side 11a and preferably abutting the side 11a during use. The base plate 24a is preferably integrally molded with flange 24b with the parts formed to maintain their relative orientation perpendicular to each other, or at whatever other angle matches the angle between sides 11a, 11b. But base plate 24a and flange 24b can optionally be hinged together and flexibly joined along a hinge line at the intersection of the plane in which each part lies.

Figure 3D:
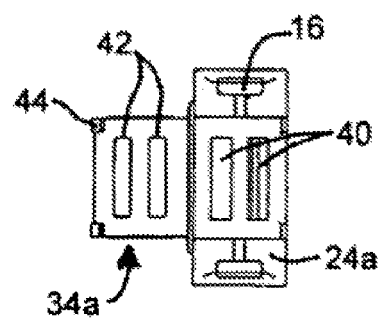
Figure 3C:
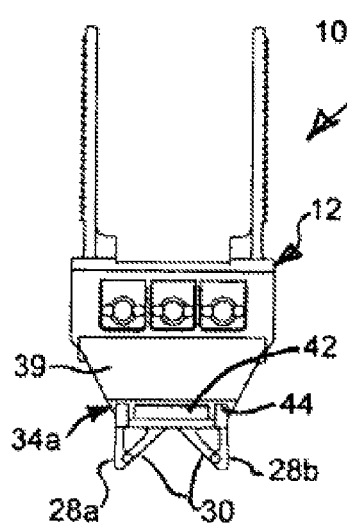
Figure 3A:
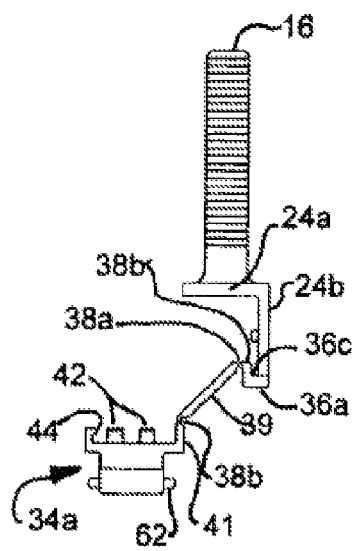
Figure 3B:
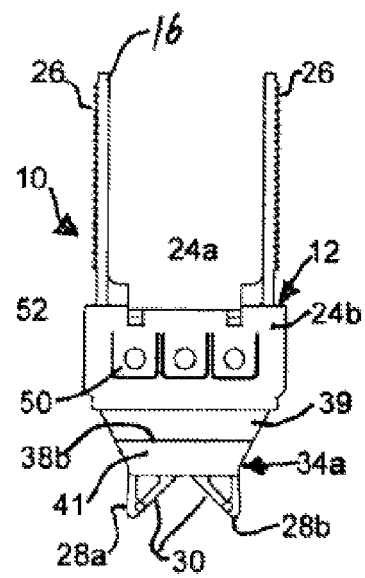
Figure 3E:
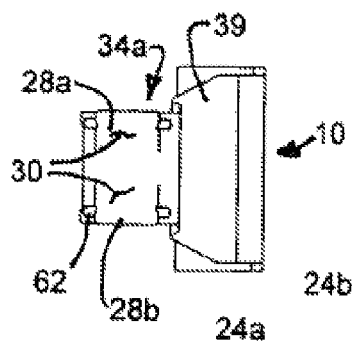
Figure 7D:
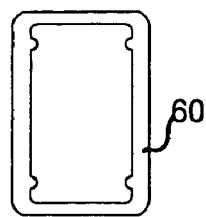
Figure 6:
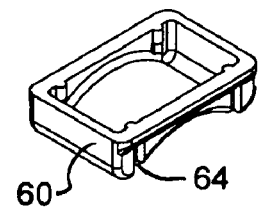
Figure 7C:
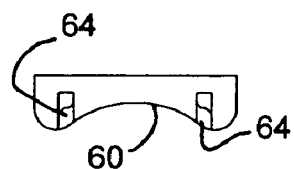
Figure 7A:
FIG. 7a is a side plan view of the cover of FIG. 6.
Figure 7B:
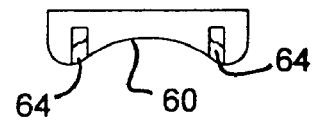
Figure 7E:
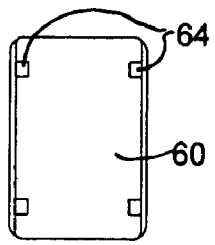
Figure 10A:
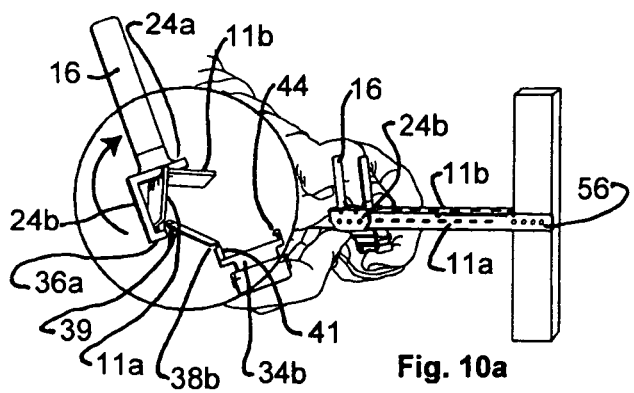
FIG. 10a-d are combinations of perspective views with plan view enlargements showing a sequence of steps for fastening the bracket of FIG. 9 to the support bar to form the assembly of FIG. 1.
Figure 10B:
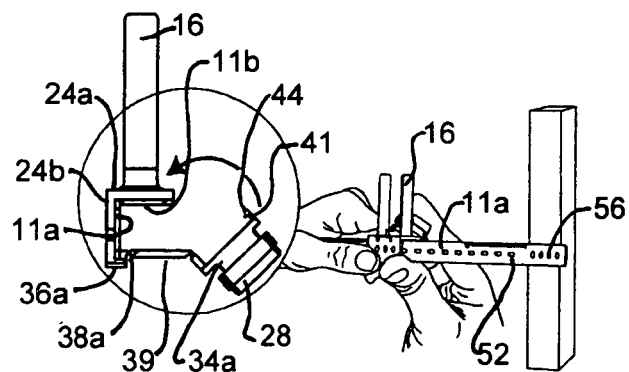
Figure 10C:
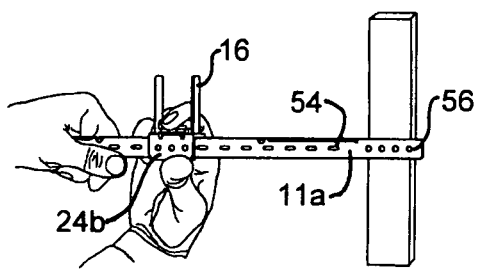
Figure 10D:
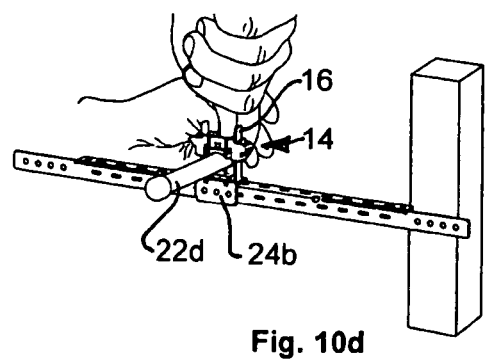

Attached to the base plate 24a and forming part of base 12 during use, is the fourth segment, engaging member 34a that releasably latches the base plate 24a to the support cross-member 11. The engaging member 34a comprises a hinged connecting part that is rotatably or hingedly connected to base plate 24b through intermediate structure that wraps around a cross-section of the cross-member 11. Preferably, as seen in FIGS. 2-3, the distal end of support plate 24b has a shaped end 36 having a lateral portion 36a and an lip portion 36b which combine to form a recess 36c (FIG. 3a) into which the support member 11a fits during use as seen in FIGS. 10a-10b. An intermediate member 39 fastens to the lip 36, preferably to the distal end of lip 36b, preferably along hinge line 38a (FIGS. 1c and 3a). The engaging member 34a is fastened to the end of the third segment which is the intermediate member 39. The engaging member 34a fastens to intermediate member 39 along hinge line 38b, located opposite hinge line 39a. The intermediate member is interposed between and connected to the fourth segment 34a and the second segment 24b. Intermediate member 39 advantageously takes the form of a sheet of material, and is preferably a sheet of material, and ideally a triangular sheet of material which tapers from a wider dimension at flange 24b to a narrower dimension at engaging portion 34a, a narrower dimension which is preferably small enough to fit between the arms 16. The second segment 24b preferably extends between and slightly beyond the arms 16 as does the adjoining portion of the intermediate member 39. The distal portion of intermediate member 39 is preferably narrow enough to fit between arms 16, as is the fourth segment 34a to which the distal portion of intermediate member 39 is fastened.

The proximal end 36 adjacent to and adjoining flange 24b is preferably, but optionally configured so the support side 11a fits snuggly into the recess 36c. In a variation, the side 24b can extend in the same plane as but sufficiently beyond the adjacent cross-member 11a to allow the intermediate member 39 to join the side 24b along hinge line 38a—without any lateral offset as formed by the bottom edge 36a.

The support base 24a, flange 24b, intermediate portion 39 and engaging portion 34a are configured to encircle the cross-member 11. Advantageously, these four parts comprise four segmented portions joined at angles or joined by flexible hinge lines, and configured to encircle a three-sided cross-member 11, with the first and second segments 24a, 24b placed along sides 11b, 11a, respectively, of the outer surface of cross member 11, with the third segment (intermediate member 39) spanning the opposing distal edges of sides 11a, 11b, and the fourth segment (engaging member 34a) overlapping at least a portion of the first segment (base plate 24a). The first and last segments 24a, 34a of this four-segment assembly overlap and releasably lock together. Thus, the engaging portion 34a releasably engages the base 24a to hold the bracket 10 to the support 11.

Preferably the support base 24a has one or more openings 40 into which a mating projection 42 fits to releasably hold the parts together and restrain movement in the plane of the support base 24a. A snap fit is possible (but not preferred) so that part of the projection 42 is optionally slightly larger than the mating opening 40. A deformable wedge fit is also believed suitable. Preferably though, the projection 42 is made of a deformable elastomeric material, such as Nylon or polyethylene, with a textured or roughened side located to frictionally engage the sides of opening(s) 40. Advantageously there are two openings 40a, 40b in support base 24a and two correspondingly located and shaped projections 42a, 40b on one side of engaging mechanism 34a—the side facing away from the support 24a during use. Preferably the openings 40a, 40b comprise two parallel slots extending along a length of the base 24b between the arms 16, with the projections 42 comprising correspondingly shaped, rectangular cross-sectioned projections 42a, 40b. When the projections 42 fit into the openings 40, lateral movement in the plane of base 24a and engaging mechanism 34a is restrained by the close fit between the projections 42 and openings 40.

Further, the projections 42 are sized to extend through the openings 40 and extend beyond the thickness of the base plate 24a so one or more of the projections 42 abut the cross-member 11. The projections 42 are thus slightly longer than a thickness of the base plate 24a. The projections 42 are not much longer than the thickness of plate 24a, and amount of excess length will vary with the hardness of the projections 42 as the projections abut against the support 11 and deform to an extent that varies with the hardness of the projections 42. The second segment or flange 24b is preferably sized to be slightly larger than the abutting side 11a of the cross member 11, so the top side 11a is slightly spaced apart from the facing surface of the first segment or base plate 24a.

To make it easier to engage projections 42 with opening 40, the engaging member 34a is preferably parallel with the base 24a, and to better achieve this parallel alignment an offset 41 is preferably placed between hinge line 38b and latch portion 34a. The intermediate member 39 could extend to or above the plane of the base plate 24a but the offset 41 extends vertically, parallel to sides 24b and 11a, and helps reduce the size of the bracket 10, just as the lateral offset 36a also helps reduce the size—but along a different axis or side.

The projections 42 are on one side of the engaging portion 34a, and the supports 28 are on the opposing side, the side facing away from base 24a during use. The engaging mechanism 34a has one or more releasable locking or latching members 44 to help hold the engaging projections 42 from moving out of the openings 40. The latching members 44 are preferably on a distal edge of the engaging mechanism 34a. A mating catch or recess 46 is preferably formed in base 24a, preferably along the corner where the sides 24a, 24b join. The latch 44 engages the catch 46 to hold the engaging mechanism 34a to the base 24a and restrain movement along axis 18 (FIG. 2) which is generally orthogonal to the plane of base plate 24a, engaging portion 34a and support 11b.

Referring to FIGS. 2a and 8a, the flange or side 24b optionally has one or more movable tabs 50, with a projection 52 extending from the face of the tab toward the cross-member 11 during use. The tabs 50 are preferably rectangular and can be easily formed by cutting through the thickness of the side 24b on three sides of the rectangle to form a resilient member. The projections 52 are located and sized to fit into and engage recesses 54 in the cross-member 11. Preferably, the projections 52 are cylindrically shaped with rounded ends and fit into short slots 54 (FIGS. 1a and 10) formed in the sides 11a, 11b of the cross-member 11. Openings 56 can be formed in the distal ends of the cross-member 11 to allow nails, screws or other fasteners to fasten the cross-member to the support studs.

A series of regularly spaced and elongated slots 57 are preferably formed in along the juncture of sides 11a, 11b to form a weakened line along the length of the slots 57 at which a strip of metal is bent to form the cross member 11. Thus, an elongated strip of flat metal can have holes 54, 56, and 57 formed in it by punching, laser cutting or other means, and then have the flat strip of metal bent at right angles to form cross member 11. The end tabs containing nail holes 56 are preferably formed before bending along the slots 57, and are formed by cutting off portions of the side wall 11b to form end tabs of a desired length. The cross-member is preferably made of mild steel that is painted, coated or electroplated to resist corrosion, but any metal, or even a suitably strong plastic is believed suitable.

The supports 28 preferably have an elastic cushion 60 covering them to reduce vibration transmission. FIG. 7 shows the cushion 60, with recesses 64 in the sides to mate with projections 62 on the lateral sides of supports 28 to help hold the cushion on the support. The construction of the cushions are known in the art and described more completely in application Ser. No. 10/734,953, titled Pipe and Cable Holder, the complete contents of which are incorporated herein by reference.

The clamp block 14 has supports 28 over which cushion 60 is also placed. The clamp block 14 has openings through which the arms 16 pass, with pawls 66 (FIG. 1c) located to releasably engage teeth 26 on the arms to releasably hold the clamp block on the arms 16. Such clamp blocks 14 and arms 16 are known in the art and not described in detail herein.

During use, a cross-member 11 is fastened to the building supports and the bracket 10 fastened to the cross-member. Alternatively, the bracket 10 could be fastened to the cross-member 11 first. Referring to FIGS. 10a-10d, the bracket 10 is fastened to the cross-member by fitting the distal edge of side 24b into the recess 36c and then aligning the sides 11a, 11b with sides 24b, 24a, respectively, of the bracket 10. Projections 52 on tabs 50 on side 24b preferably mate with recesses 54 in side 11a to restrain movement of the bracket 10 along the length of the cross-member. The tabs 50 act as resilient leaf springs to resiliently urge the projections 52 into the openings 54. Manually disengaging the tabs and projections allows sliding the bracket along the cross-member 11 for positioning. The spacing and/or shape of the recesses 54 and projections 52 allow a variety of adjustable positioning.

After the cross-member 11 and base 24a, 24b are fitted together with the edge of side 11a nesting in recess 34c, then the intermediate member 39 and engaging mechanism 34a are wrapped around the cross-section of the cross-member 11. The projections 42 fit into the openings 40 and preferably, but optionally, abut side 11b of the cross-member. The latch 44 engages the catch 46 to hold or to further hold the parts together. The elongated member such as pipe 22 is placed between the arms 20 and against the supports 28, with the clamp block 14 placed on the arms 16 and urged toward base 12 to clamp and hold the pipe 22 between the arms 16 and between the supports 28 on the base 12 (via engaging mechanism 34a) and clamp block 14. The sequence is reversed to remove or reposition the bracket 10.

The two segments 24a, 24b are adjacent to the cross member 11 while engaging portion 34a abuts base plate 24a and cross member 11b with base plate 24a interposed between the engaging portion 34a and cross member 11b. The projections 42 pass through the base plate 24a to abut cross member 11b and restrain lateral motion in the plane of plate 24a, while the engaging latch parts 44 and 46 hold the engaging portion 34a in its engaged position. The latches 44, 46 can be manually released.

Advantageously, but optionally, the supports 28a, 28b each form a single surface facing the pipe 22 (FIG. 1), but the supports 28a, 28b could be formed by parallel, spaced apart plates that extend from base plate 24 toward the pipe 22 and having distal edges shaped to receive the pipe. Advantageously, but optionally, the base support 28 is fastened to the arms 16 at or adjacent to the base plate 12.

In use, the base 24a, 24b is fastened to the cross member 11 and the engaging portion 34a engaged with the base 24a, and latch parts 44, 46 are engaged. Then a pipe or elongated member 21 is fastened to the outer facing portion of the engaging portions 34a. In the depicted embodiment this is achieved by placing an elongated member 21, such as a pipe, between the parallel ratchet arms 16 and against the inclined surfaces 28 on the engaging portion 34a. Then the arms 16 pass through mating slots in the clamp block 14 where the ratchet teeth 26 on the arms 16 engage the pawl 66 onto the arms 16. The block 14 has inclined surfaces 28 which form a V shaped notch to engage the elongated member 21 opposite the surfaces 28 on the engaging surface 34a to hold the elongated member 21 in position, allowing easier installation and requiring fewer hands to simultaneously hold the parts in position during installation.

Advantageously the cushion 60 is placed on the supports 28 before the pipe 21 is placed between the inclined surfaces 28. The pawl 66 can be manually released to remove the clamp block 14.

The parts are advantageously integrally molded of an elastomer, which reduces costs. A nylon plastic is believed suitable. The cushion 60 is preferably made of an acoustic deadening material which does not readily transmit sound or vibrations.

The device mounting mechanism for retaining the elongated member 21 against the engaging plate 34a is shown as the parallel ratchet arms 16 and clamp block 14. But any pipe holding mechanism could be used with the bracket, including a strap with opposing ends fastened to the base plate 24 or engaging portion 34a or both. For example, referring to FIG. 11a, a strap 70 with a head 72 could be passed through opening 74 in base plate 24a or engaging portion 34a (not shown), with the distal end of the strap 70 having ratchet teeth to engage a pawl mechanism on the other side of the base plate 24a or engaging portion 34a or in the head 72. The pawl and ratchet could be replaced with any of a variety of known buckles or fastening mechanisms. Future fastening mechanisms could also be used whether releasable or permanent type mechanisms.

Referring to FIG. 11b, the pipe holding mechanism comprises two curved arms 76 with portions of a releasable locking mechanism 78 on each distal end of the arms 76. The depicted locking mechanism 78 is illustrated as a snap-fit, tongue in groove mechanism that encircles the elongated member 22. The mechanism is fastened to the top of the base plate 24a, but could be fastened to the engaging portion 34a. The mechanism is preferably integrally molded with the base plate 24a or the engaging portion 34a.

Referring to FIG. 11c, the pipe holding mechanism takes the form of a curved strap 80 with extending tabs 82 at each end of the strap. One tab 82 extends through a slot in base plate 24 and is held between the base plate 24a and the cross member 11 while the other tab 82 has a hole through which threaded fasteners 84 extend to fasten the tab 82 to the base plate 24a. The strap 80 encircles the elongated member 22 to hold it to the bracket 10 that encircles the cross member 11. The tabs 82 are described as being fastened to the base plate 24a, but could be fastened to the engaging portion 34a. The strap 80 is preferably flexible. But it could take the form of a curved rod with threaded ends fitting through holes in the base top 24a and through recesses 54 where nuts engage the threaded ends.

In further variations, the base plate 24, or at least the fourth engaging segment 34a, could be configured to engage an elongated member 21 as shown in each of the following patents as described therein: U.S. Pat. Nos. D490,690, D379, 584 (base with a semicircular recess and a semi-circular strap bolted thereto to encircle a pipe or elongated member 22); U.S. Pat. No. D368,422 (C-shaped holder with an elongated member 22 snap fit into the open portion of the C); U.S. Pat. No. 4,899,964 (one or more U shaped flanges with a mating member closing the open end of the U to encircle an elongated member 22); U.S. Pat. No. 5,876,000 (a ratchet member fastened to two opposing ratchet arms to urge holding an elongated member 22 to a base); U.S. Pat. No. 5,833,179 (elongated strap with semicircular recesses to hold various sized elongated members 22); U.S. Pat. No. 6,250,847 (pivoted strap encircles pipe or elongated member 22); U.S. Pat. No. 5,547,152 (L shaped bracket with one leg fastened to a duct or bracket and the other leg at an angle thereto and encircling an elongated member 22); U.S. Pat. No. 4,957,251 (semicircular flange with mounting tabs encircling a portion of an elongated member 22 with the tabs holding threaded fasteners fastened to a support); U.S. Pat. No. 4,763,867 (base with a spring element that is optionally corrugated to engage the elongated member 22); U.S. Pat. No. 4,037,810 (U shaped body portions holding elongated members 28). The complete contents of each of these above identified patents are incorporated herein by reference. Each of these patents discloses a releasable device mounting mechanism for holding elongated members such as pipes and electrical conduits and electrical wires to the bracket 10, and given the above disclosure, each of these releasable mounting devices can be formed on the first base segment 24a or on the fourth engaging segment 34a, or can have portions of the mounting device on both the first and fourth segments 24a, 34a.

The above description is given by way of example, and not limitation. Given the above disclosure, one skilled in the art could devise variations that are within the scope and spirit of the invention disclosed herein, including various ways of releasably or permanently fastening the elongated member 21 to the support plate 24a, to the engaging portion 34a, or to both. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A mounting assembly for mounting items between studs of a building, comprising:

an elongated support member having two elongated sides generally perpendicular to each other and having opposing ends adapted to fasten the support member to studs of a building;

a locking bracket having four segments comprising a first base segment, a second flange segment, a third intermediate segment and a fourth distal segment, with a flexible juncture at least between the flange and intermediate segment and with the base segment and flange either abutting or being close to adjacent sides of the elongated support member during use, at least one of the base segment and distal segment having at least a portion of a device mounting mechanism thereon with the distal segment and base segment each having a portion configured to fit together in abutting relationship to restrain movement of the distal end parallel to the plane of the base segment, wherein the base segment has at least one opening and the distal segment has a projection configured to extend through the opening in the base during use of the assembly to nest with the base and restrain movement parallel to the plane of the base.

2. The mounting assembly of claim 1, further comprising a latch mechanism connecting the distal segment to one of the first or second segments to hold the distal segment in position during use.

3. The mounting assembly of claim 1, wherein there are only two sides on the elongated support member, each side having a plurality of spaced holes therein and a plurality of elongated slots at and extending along the juncture of the two sides.

4. The mounting assembly of claim 1, wherein the projection abuts the support member.

5. The mounting assembly of claim 1, wherein the second segment is slightly larger than the adjacent side of the cross member so the projection abuts the support member while some or all of the first segment does not abut the side of the cross member aligned with that first segment.

6. The mounting assembly of claim 1, wherein the device mounting mechanism comprises a V-shaped structure formed on a first side of the distal segment.

7. The mounting assembly of claim 4, wherein the distal segment has opposing first and second sides with the device mounting mechanism on the first side and at least one projection extending from the second side and configured to engage at an opening in the base segment to nest with the projection.

8. The mounting assembly of claim 7, further comprising a latch mechanism holding the distal segment to the base segment during use.

9. The mounting assembly of claim 6, wherein the mounting device further comprising a pair of ratchet arms extending from the base segment, and a clamp having two openings each configured to receive one of the ratchet arms.

10. The mounting assembly of claim 2, wherein the latching mechanism restrains motion of the distal segment in a direction orthogonal to the base segment.

11. A mounting bracket for mounting devices to an elongated support member extending between studs of a building, the elongated support member having two generally perpendicular sides to define a generally triangular cross-section, comprising:

four sequentially joined segments including a first base segment, a second flange segment, a third intermediate segment and a fourth distal segment, with a flexible juncture between the third segment and each of its adjoining second and fourth segments, joining the third segment to its adjoining segments, at least one of the first base segment and fourth distal segment having at least a portion of a device mounting mechanism thereon with the fourth distal segment and first base segment each having a portion configured to nest together in abutting relationship to restrain movement of the fourth distal segment in a plane parallel to the first base segment, and wherein the fourth distal segment has first and second opposing sides with at least a portion of the device mounting mechanism on the first side and at least one projection extending from the second side, the at least one projection configured and located to extend through a mating opening in the first base segment a distance sufficient to abut the elongated support member during use of the bracket.

12. The mounting bracket of claim 11, further comprising a latch mechanism releasably fastening the fourth distal segment to the first or second segments to keep the distal segment from moving away from the first base segment during use.

13. The mounting bracket of claim 11, wherein the projection comprises the nesting portion that restrains movement in the plane of the base, the bracket further including a latch mechanism oriented to restrain movement orthogonal to the plane of the first base segment.

14. The mounting bracket of claim 11, wherein the device mounting mechanism comprises a V-shaped structure formed on the first side of the distal segment and parallel ratchet arms on the first segment and a clamp having two openings each configured to receive one of the ratchet arms.

15. The mounting bracket of claim 11, further comprising resilient members on the second segment having projections resiliently urged toward the elongated support member during use, the projections sized and configured to fit within openings on the elongated support member during use of the mounting bracket.

16. The mounting bracket of claim 11, wherein the second segment comprises a flange rigidly joined to the base and extending perpendicular thereto.

17. The mounting bracket of claim 11, wherein the second segment has a channel adjacent the third segment which channel is configured to receive an edge of the support member during use and wherein the channel is sized to restrain movement of that edge perpendicular to the first base segment during use.

18. The mounting bracket of claim 11, wherein the base, first and second segments and distal segment are integrally molded of an elastomer with a reduced thickness forming a hinge line extending between the first and second segments and between the second segment and the distal segment.

19. A method for fastening a support bracket to a generally horizontal elongated support in a building, the support having a generally triangular cross-section with first and second segments which are generally perpendicular to each other, comprising:

providing a bracket having four segments comprising a first base segment, a second flange segment, a third intermediate segment and a fourth distal segment, the distal segment having opposing first and second sides with a mounting portion on the first side and a projection on the second side and an opening extending through the base;

placing the first base segment and second segment of the bracket adjacent the first and second segments of the support, respectively;

rotating the second segment of the bracket until the fourth distal segment is adjacent the first base segment;

placing the projection through the opening in the first base segment until the projection abuts the support member, and latching the distal segment to the bracket.

20. The method of claim 19, further comprising restraining the projection from disengaging the opening.

21. The method of claim 19, further comprising extending projections on the second flange segment into openings on the elongated support to restrain movement of the flange segment relative to the support in a plane parallel to the second flange segment.

22. A mounting assembly for mounting items between studs of a building, comprising:

an elongated support member having two elongated sides generally perpendicular to each other and having opposing ends adapted to fasten the support member to studs of a building;

a locking bracket having four segments comprising a first base segment, a second flange segment, a third intermediate segment and a fourth distal segment, with a flexible juncture at least between the flange and intermediate segment and with the base segment and flange either abutting or being close to adjacent sides of the elongated support member during use, at least one of the base segment and distal segment having at least a portion of a device mounting mechanism thereon with the distal segment and base segment each having a portion configured to fit together in abutting relationship to restrain movement of the distal end parallel to the plane of the base segment, wherein the second segment comprises a flange rigidly joined to the base segment and extending perpendicular thereto, and wherein the second flange segment has projections resiliently urged toward the adjacent portion of the support member, and wherein the support member has openings sized to receive the projections on the second flange segment.

23. A mounting assembly for mounting items between studs of a building, comprising:

an elongated support member having two elongated sides generally perpendicular to each other and having opposing ends adapted to fasten the support member to studs of a building;

a locking bracket having four segments comprising a first base segment, a second flange segment, a third intermediate segment and a fourth distal segment, with a flexible juncture at least between the flange and intermediate segment and with the base segment and flange either abutting or being close to adjacent sides of the elongated support member during use, at least one of the base segment and distal segment having at least a portion of a device mounting mechanism thereon with the distal segment and base segment each having a portion configured to fit together in abutting relationship to restrain movement of the distal end parallel to the plane of the base segment, wherein the second segment comprises a flange rigidly joined to the base segment and extending perpendicular thereto, and wherein the second segment has a channel adjacent the third segment which channel is configured to receive an edge of one side of the support member and wherein the channel is sized to restrain movement of that edge perpendicular to the first segment.

24. A mounting assembly for mounting items between studs of a building, comprising:

an elongated support member having two elongated sides generally perpendicular to each other and having opposing ends adapted to fasten the support member to studs of a building;

a locking bracket having four segments comprising a first base segment, a second flange segment, a third intermediate segment and a fourth distal segment, with a flexible juncture at least between the flange and intermediate segment and with the base segment and flange either abutting or being close to adjacent sides of the elongated support member during use, at least one of the base segment and distal segment having at least a portion of a device mounting mechanism thereon with the distal segment and base segment each having a portion configured to fit together in abutting relationship to restrain movement of the distal end parallel to the plane of the base segment, wherein the base, first and second segments and distal segment are integrally molded of an elastomeric material with a reduced thickness forming a hinge line extending between the second segments and third segments and between the third segment and the distal segment.

* * * * *